(12) United States Patent
Blattert et al.

(10) Patent No.: US 10,260,582 B2
(45) Date of Patent: Apr. 16, 2019

(54) METHOD FOR MAINTAINING A BRAKE SYSTEM HAVING A HYDRAULIC VEHICLE BRAKE AND ELECTROMECHANICAL BRAKE DEVICE

(71) Applicant: Robert Bosch GmbH, Stuttgart (DE)

(72) Inventors: Dieter Blattert, Kirchheim/Neckar (DE); Edith Mannherz, Weinsberg (DE); Frank Baehrle-Miller, Schoenaich (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/631,045

(22) Filed: Jun. 23, 2017

(65) Prior Publication Data
US 2018/0038432 A1 Feb. 8, 2018

(30) Foreign Application Priority Data

Aug. 2, 2016 (DE) .......................... 10 2016 214 219

(51) Int. Cl.
| | |
|---|---|
| *F16D 65/18* | (2006.01) |
| *B60T 8/48* | (2006.01) |
| *B60T 13/74* | (2006.01) |
| *B60T 17/16* | (2006.01) |
| *F16D 55/224* | (2006.01) |
| *B60T 7/10* | (2006.01) |
| *F16D 121/04* | (2012.01) |
| *F16D 121/24* | (2012.01) |

(Continued)

(52) U.S. Cl.
CPC ............ *F16D 65/183* (2013.01); *B60T 8/489* (2013.01); *B60T 13/741* (2013.01); *B60T 17/16* (2013.01); *F16D 55/224* (2013.01); *B60T 7/107* (2013.01); *B60T 8/3255* (2013.01); *F16D 2121/04* (2013.01); *F16D 2121/24* (2013.01); *F16D 2123/00* (2013.01)

(58) Field of Classification Search
CPC .......... F16D 65/183; B60T 8/48; B60T 17/16; B60T 13/741
See application file for complete search history.

(56) References Cited

U.S. PATENT DOCUMENTS

| | | | | |
|---|---|---|---|---|
| 5,915,504 A | * | 6/1999 | Doricht | B60T 8/321 188/158 |
| 2013/0261917 A1 | * | 10/2013 | Kotake | B60T 13/741 701/70 |

(Continued)

FOREIGN PATENT DOCUMENTS

DE 10 2004 004 992 A1 9/2005

*Primary Examiner* — Vishal R Sahni
(74) *Attorney, Agent, or Firm* — Maginot, Moore & Beck LLP

(57) ABSTRACT

A method for maintaining a brake system in a vehicle with a hydraulic vehicle brake and an electromechanical brake device with an electric brake motor includes preparing the brake system for maintenance operations by actuating the electric brake motor to displace a transmission member into a retracted position that is remote from a brake starting position in which a brake lining is located adjacent to a brake disk of the wheel brake device. The method further includes actuating the electric brake motor to displace the transmission member in the direction of the brake starting position after completion of the maintenance operations.

6 Claims, 3 Drawing Sheets

(51) Int. Cl.
*F16D 123/00* (2012.01)
*B60T 8/32* (2006.01)

(56) References Cited

U.S. PATENT DOCUMENTS

| 2015/0115697 A1* | 4/2015 | Yamamoto | B60T 7/042 |
| | | | 303/3 |
| 2016/0076609 A1* | 3/2016 | Narula | B60T 17/22 |
| | | | 188/73.33 |

* cited by examiner

METHOD FOR MAINTAINING A BRAKE SYSTEM HAVING A HYDRAULIC VEHICLE BRAKE AND ELECTROMECHANICAL BRAKE DEVICE

This application claims priority under 35 U.S.C. § 119 to patent application no. DE 10 2016 214 219.4, filed on Aug. 2, 2016 in Germany, the disclosure of which is incorporated herein by reference in its entirety.

BACKGROUND

The disclosure relates to a method for maintaining a brake system in a vehicle having a hydraulic vehicle brake and having an electromechanical brake device.

DE 10 2004 004 992 A1 discloses a brake system for a vehicle which comprises a hydraulic vehicle brake and an electromechanical brake device having an electric brake motor. During regular brake operation, the hydraulic vehicle brake is activated in order to decelerate the vehicle. The electromechanical brake device is used as a parking brake and produces via the electric brake motor a brake force in the vehicle stopped state. The electric brake motor acts on the same brake piston as the hydraulic vehicle brake and displaces a brake lining at the end face of the brake piston against a brake disk.

SUMMARY

The method according to the disclosure can be used in vehicles with a brake system which comprises a hydraulic vehicle brake and an electromechanical brake device having at least one electrical brake motor. Typically, during regular braking operation, the vehicle is braked by means of an actuation of the hydraulic vehicle brake. The electromechanical brake device is preferably used to fix the vehicle in the stopped state by the electric brake motor being actuated and a brake force which fixes the vehicle being produced in an electromechanical manner. Optionally, the electromechanical brake device may also be used additionally or alternatively to the hydraulic vehicle brake to brake the vehicle during the travel.

The electromechanical brake device is integrated in a wheel brake device of the hydraulic vehicle brake. The brake piston in the wheel brake device can be displaced both by hydraulic brake fluid of the hydraulic vehicle brake and at the same time or independently of each other by the electric brake motor in the direction toward the brake disk. According to an advantageous embodiment, in both wheel brake devices on the rear axle there is located an electromechanical brake device having an electric brake motor.

The method according to the disclosure is carried out in order to prepare the brake system for a maintenance operation. In order to carry out maintenance operations, for example, a replacement of the brake linings or the brake disk, a transmission member which is pressed by the electric brake motor in the event of an electromechanical braking operation against the brake piston and in the direction toward the brake disk is displaced into a retracted position which is located at a distance with respect to a brake starting position, in which the brake lining is located on the brake piston adjacent to the brake disk. The transmission member is consequently located in the retracted position at a greater distance from the brake disk than in the brake starting position, in which the brake lining generally has only a minimal spacing from the brake disk. By the electric brake motor being controlled in such a manner that the transmission member is displaced into the retracted position which is further away, the required maintenance operations can, for example, be carried out on the brake disk or on the brake linings; for this purpose, the brake piston which is a carrier of the brake lining is advantageously axially retracted from the brake disk.

The transmission member is, for example, a spindle nut which is located on a spindle which rotates with the motor shaft of the electric brake motor and which, in the event of a rotational movement of the motor shaft or spindle, is displaced axially between the retracted position and the brake starting position. During a brake application operation in order to produce brake force, the electric brake motor is controlled in such a manner that the transmission member displaces the brake piston in the direction toward the brake disk. During a release operation, the electric brake motor is controlled in the opposite direction.

After the maintenance operations have been finished, the electric brake motor is again controlled in such a manner that the transmission member is again displaced in the direction of the brake starting position thereof, from which an electromechanical brake force can be built up in a short space of time. Accordingly, the transmission member overcomes the axial path from the more remote retracted position to the brake starting position located closer to the brake disk.

This procedure has the advantage that the brake fluid volume, which has been displaced at the beginning of the maintenance operations when the transmission member is moved from the brake starting position to the retracted position, flows during the opposite displacement movement of the transmission member into the brake circuit again so that an undesirable dead volume in the brake circuit is prevented.

The displacement movement of the transmission member which displaces the brake piston during movement from the retracted position into the brake starting position is preferably carried out exclusively by means of the actuation of the electric brake motor. An actuator which may optionally be arranged in the hydraulic vehicle brake and which can be electrically controlled in order to influence the hydraulic pressure of the brake fluid preferably remains non-activated so that this actuator is not subjected to any electrical and mechanical load for the duration of the maintenance operation. An actuation of the brake pedal in order to move the brake piston and the transmission member from the retracted position into the brake starting position is also not required.

After the transmission member and the brake piston have again reached the brake starting position, the maintenance is ended and the brake system can again perform its correct function with the hydraulic vehicle brake and with the electromechanical brake device.

The electrically controllable actuator for influencing the hydraulic pressure is, for example, a pump motor or an electromechanical brake booster having an EC motor which actuates, for example, by means of a gear mechanism, the main brake cylinder in the hydraulic vehicle brake (iBooster), for example, by means of the gear mechanism an input rod and the primary piston of the (tandem) main brake cylinder.

According to another advantageous embodiment, which relates to a brake system having an electrically controllable actuator in order to influence the hydraulic pressure, the electrically controllable actuator remains blocked for the duration of the maintenance operations and is released again only after the electric brake motor has displaced the transmission member into the brake starting position again. In this manner, it is ensured that inadvertent control of the actuator is eliminated. In the regular operating state, the electrically controllable actuator reacts when constructed as an iBooster to an actuation of the brake pedal and displaces the main brake cylinder. By the electrically controllable actuator being blocked during the maintenance operations, the actuator is prevented from being activated when the brake pedal is actuated. Only after the electric brake motor has moved the transmission member into the brake starting position and the maintenance operations are finished is the electrically controllable actuator released again in order to reinforce brake pedal actuations.

According to another advantageous embodiment, the actuation of the electric brake motor after the transmission member has been displaced into the retracted position is blocked for the duration of the maintenance operations. It is thereby ensured that, during the maintenance operations, the brake motor does not inadvertently displace the transmission member and the brake piston in the direction of the brake starting position. After the maintenance operations have finished, the brake motor is released again in order to displace the transmission member into the brake starting position and the transmission member is displaced by the brake motor into the brake starting position; subsequently, the maintenance operation is ended.

The retracted position, into which the transmission member is moved back at the beginning of the maintenance operations, is an end stop position according to an advantageous embodiment. The end stop position of the transmission member is the position which is furthest from the brake starting position.

The method steps are generally carried out in a regulation or control device in which actuation signals for controlling the different components of the brake system with the hydraulic vehicle brake and the electromechanical brake device are produced.

BRIEF DESCRIPTION OF THE DRAWINGS

Other advantages and advantageous embodiments can be derived from the additional claims, the description of the figures, and the drawings, in which:

In the Figures, components which are identical are given the same reference numerals.

DETAILED DESCRIPTION

Figure 1:
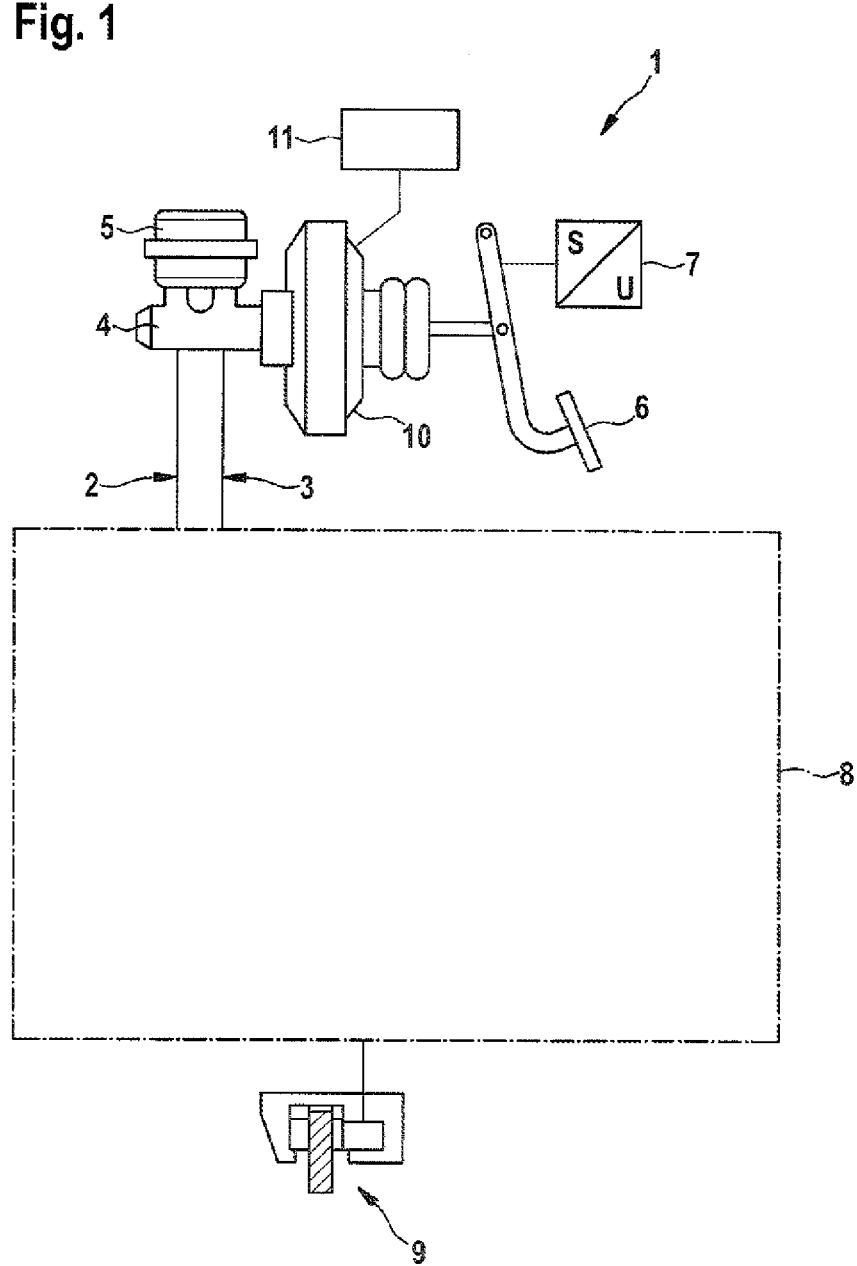
FIG. 1 is a schematic illustration of a hydraulic vehicle brake having a brake booster, wherein the wheel brake devices of the vehicle brake on the rear vehicle axle are additionally provided with an electromechanical brake device having an electric brake motor.

The hydraulic vehicle brake 1 illustrated in FIG. 1 for a vehicle comprises a front axle brake circuit 2 and a rear axle brake circuit 3 for supplying and controlling wheel brake devices 9 on each wheel of the vehicle with a brake fluid which is under hydraulic pressure. The two brake circuits 2, 3 are connected to a common main brake cylinder 4 which is supplied with brake fluid by means of a brake fluid storage container 5. The main brake cylinder piston inside the main brake cylinder 4 is actuated by the driver via the brake pedal 6 and the pedal travel applied by the driver is measured by means of a pedal travel sensor 7. There is between the brake pedal 6 and the main brake cylinder 4 a brake booster 10 which comprises, for example, an electric motor which preferably actuates the main brake cylinder 4 by means of a gear mechanism (iBooster).

The actuation movement of the brake pedal 6 measured by the pedal travel sensor 7 is transmitted as a sensor signal to a regulation or control device 11, in which actuation signals for controlling the brake booster 10 are produced. The supply of the wheel brake devices 9 with brake fluid is carried out in each brake circuit 2, 3 by means of various switching valves, which together with other units are part of a brake hydraulic system 8. There further belongs to the brake hydraulic system 8 a hydraulic pump which is an integral component of an electronic stability control system (ESC).

Figure 2:
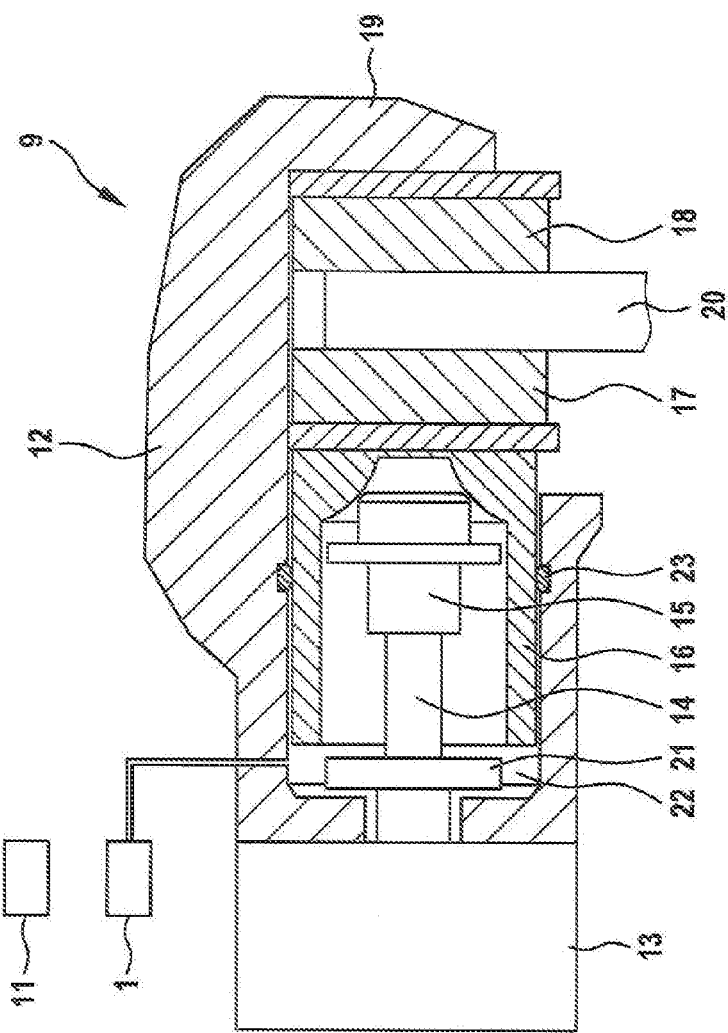
FIG. 2 is a section through an electromechanical brake device having an electric brake motor.

In FIG. 2, the wheel brake device 9 which is arranged on a wheel on a rear axle of the vehicle is illustrated in detail. The wheel brake device 9 is part of the hydraulic vehicle brake 1 and is supplied with brake fluid 22 from the rear axle brake circuit. The wheel brake device 9 further has an electromechanical brake device which is preferably used as a parking brake for securing a vehicle in the stopped state but which, during a movement of the vehicle, in particular at low vehicle speeds below a speed limit value, can also be used to brake the vehicle.

The electromechanical brake device comprises a brake caliper unit 12 with a caliper 19 which engages over a brake disk 20. The brake device has as an actuation member a direct current electric motor acting as a brake motor 13 whose rotor shaft rotatably drives a spindle 14, on which a spindle nut 15 is supported in a rotationally secure manner During a rotation of the spindle 14, the spindle nut 15 is axially displaced. The spindle nut 15 moves inside a brake piston 16 which is the carrier of a brake lining 17 which is pressed against the brake disk 20 by the brake piston 16. At the opposite side of the brake disk 20 there is another brake lining 18 which is retained in a fixed manner on the caliper 19. The brake piston 16 is sealed at the outer side thereof by means of a surrounding sealing ring 23 in a pressure-tight manner with respect to the receiving housing.

Within the brake piston 16, the spindle nut 15 can move in the event of a rotational movement of the spindle 14 axially forward in the direction toward the brake disk 20 or in the event of an opposing rotational movement of the spindle 14 axially backward until an end stop 21 is reached. In order to produce a clamping force, the spindle nut 15 acts on the inner end face of the brake piston 16, whereby the brake piston 16 which is supported in an axially displaceable manner in the brake device is pressed with the brake lining 17 against the facing end face of the brake disk 20. The spindle nut 15 represents a transition member between the brake motor and the brake piston.

For the hydraulic brake force, the hydraulic pressure of the brake fluid 22 from the hydraulic vehicle brake 1 acts on the brake piston 16. The hydraulic pressure may also act in a supporting manner in the stopped state of the vehicle when the electromechanical brake device is actuated so that the overall brake force is composed of the component which is provided in an electromotive manner and the hydraulic component. During travel of the vehicle, only the hydraulic vehicle brake is active or both the hydraulic vehicle brake and the electromechanical brake device are active or only the electromechanical brake device is active in order to produce brake force. The actuation signals for controlling both the adjustable components of the hydraulic vehicle brake 1 and the electromechanical wheel brake device 9 are produced in the regulation or control device 11.

Figure 3:
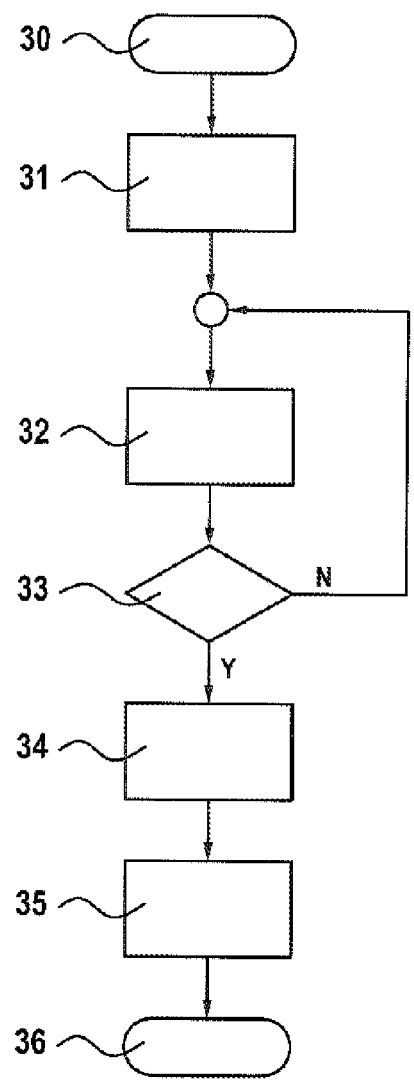
FIG. 3 is a flowchart with method steps for maintenance of the brake system.

FIG. 3 shows a flowchart with the method steps for carrying out a maintenance operation of a brake system which is constructed as illustrated in FIGS. 1 and 2. Firstly, after the start of the method in step 30, in the following step 31 the spindle nut is displaced as a transmission member between the motor shaft and the spindle which is driven by the motor shaft, on the one hand, and the brake piston, on the other hand, into an end stop position. The electric brake motor of the electromechanical brake device is to this end controlled in such a manner that the spindle nut is moved back from the brake starting position into the end stop which constitutes a retracted position. In the brake starting position, the spindle nut and the brake piston are in a brake standby position, from which, when an electromechanical brake force is requested, the piston with the brake lining can be displaced against the brake disk in an extremely short period of time. In the retracted position, however, the spindle nut 15 is located on the end stop 21 (FIG. 2).

The corresponding control of the electric brake motor in order to move the spindle nut from the brake starting position into the retracted position is preferably carried out manually by means of a switch or a corresponding diagnostic routine.

In the next step 32, a change of the brake linings or the brake disk can be carried out. In the next step 33, there is produced the interrogation as to whether the retracted position can be left again and via a corresponding control of the electric brake motor the spindle nut and the brake piston are displaced again into the brake starting position. This displacement movement can be initiated manually or by means of a diagnostic routine. If there is no corresponding request, the "no" branch ("N") is followed in order to return to step 32 again and the maintenance operations are continued.

If, in contrast, there is produced the interrogation in step 33 that a corresponding request is present and the electric brake motor for displacing the spindle nut is intended to be displaced into the brake starting position, the "yes" branch ("Y") is followed in order to advance to the next step 34. In step 34, via the control of the electric motor, the transmission member and the brake piston are moved into the brake starting position. As a result of the reduced pressure which is produced by the brake piston displacement, brake fluid is transferred at the same time from the brake fluid storage container via the main brake cylinder into the brake circuit in order to compensate for a dead volume. This ensures that the brake fluid which is displaced when the brake piston is displaced from the brake starting position into the retracted position is tracked again and a dead volume in the brake circuit is prevented.

When the electric brake motor is controlled in step 34, for example, the spindle nut is displaced to such an extent by the brake motor that the brake lining is in abutment with the brake piston on the brake disk. During this displacement movement, brake fluid is drawn into the brake circuit as a result of the volume increase. Subsequently, the electric brake motor is controlled for a defined path in the opposite release direction so that the spindle nut and the brake piston continue to move slightly away from the brake disk in the opposite direction until the brake starting position is reached.

In the following step 35, actuations of the brake booster or iBooster which have been blocked whilst the maintenance operations are being carried out are permitted again in order to prevent an overload of the electrical and mechanical system in the event of inadvertent actuation of the brake booster or iBooster. In the following step 36, the method is ended.

What is claimed is:

1. A method for maintaining a brake system in a vehicle that includes a hydraulic vehicle brake and an electromechanical brake device with an electric brake motor, a hydraulic brake pressure of the hydraulic vehicle brake and the electric brake motor configured to act on the same brake piston of a wheel brake device, the method comprising:
    preparing the brake system for maintenance operations by actuating the electric brake motor to displace a transmission member from a brake starting position at which a brake lining is spaced a first distance apart from a brake disk of the wheel brake device into a retracted position at which the brake lining is spaced a second distance apart from the brake disk of the wheel brake device, the second distance being greater than the first distance; and
    actuating the electric brake motor to displace the transmission member in the direction of the brake starting position after completion of the maintenance operations,
    wherein, during travel of the vehicle, the hydraulic vehicle brake is used alone or in combination with the electromechanical brake device to brake the vehicle,
    wherein an electrically controllable actuator in the hydraulic vehicle brake, which is configured to influence the hydraulic pressure, remains non-activated during the maintenance operations, and
    wherein the actuation of the electrically controllable actuator is blocked for the duration of the maintenance operations and is released again only after the electric brake motor has displaced the transmission member into the brake starting position.

2. The method according to claim 1, wherein the actuation of the electric brake motor is blocked for the duration of the maintenance operations and, after completion of the maintenance operations, the brake motor is released again in order to displace the transmission member into the brake starting position.

3. The method according to claim 1, wherein the retracted position is an end stop position up to which the transmission member is displaced by the electric brake motor in order to carry out the maintenance operations.

4. The method according to claim 1, wherein, when the transmission member is displaced in the direction of the brake starting position, brake fluid is drawn via a main brake cylinder from a brake fluid storage container.

5. The method according to claim 1, wherein a spindle nut is displaced as a transmission member on a spindle that is driven by the brake motor, and wherein the spindle nut displaces the brake piston in order to produce brake force.

6. The method for maintaining a brake system according to claim 1, further comprising:
    performing a maintenance operation on the brake system while the transmission member is in the retracted position before actuating the electric brake motor to displace the transmission member in the direction of the brake starting position.

* * * * *